(12) United States Patent
Munro et al.

(10) Patent No.: US 11,248,066 B2
(45) Date of Patent: Feb. 15, 2022

(54) SPRAY-DRIED ZIEGLER-NATTA (PRO)CATALYST SYSTEMS

(71) Applicant: Univation Technologies, LLC, Houston, TX (US)

(72) Inventors: Ian M. Munro, Lake Jackson, TX (US); Wesley R. Mariott, Manvel, TX (US); C. Dale Lester, South Charleston, WV (US); Nitin Borse, Pearland, TX (US); Michael D. Awe, Middlesex, NJ (US); Phuong A. Cao, Middlesex, NJ (US); Jesse C. Beilhart, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/734,615

(22) PCT Filed: Jun. 7, 2019

(86) PCT No.: PCT/US2019/035919
§ 371 (c)(1),
(2) Date: Dec. 3, 2020

(87) PCT Pub. No.: WO2019/241044
PCT Pub. Date: Dec. 19, 2019

(65) Prior Publication Data
US 2021/0230317 A1 Jul. 29, 2021

Related U.S. Application Data

(60) Provisional application No. 62/684,343, filed on Jun. 13, 2018.

(51) Int. Cl.
*C08F 4/655* (2006.01)

(52) U.S. Cl.
CPC .................. *C08F 4/6555* (2013.01)

(58) Field of Classification Search
CPC ...... C08F 4/6555; C08F 4/64; C08F 4/65916; C08F 4/65912
See application file for complete search history.

(56) References Cited

U.S. PATENT DOCUMENTS

| 3,324,095 A | 6/1967 | Carrick et al. |
| 3,709,853 A | 1/1973 | Karapinka |

(Continued)

FOREIGN PATENT DOCUMENTS

| EP | 0634421 | 1/1995 |
| EP | 0649992 | 4/1995 |

(Continued)

OTHER PUBLICATIONS

PCT/US2019/035919, International Search Report and Written Opinion dated Sep. 20, 2019.

(Continued)

*Primary Examiner* — Catherine S Branch

(57) ABSTRACT

Methods of making spray-dried Ziegler-Natta (pro)catalyst systems containing titanium Ziegler-Natta (pro)catalysts, a hydrophobic silica carrier material, and tetrahydrofuran. The spray-dried Ziegler-Natta (pro)catalyst systems made by the method. Methods of polymerizing olefin (co)monomer(s) with the spray-dried Ziegler-Natta catalyst system to make polyolefin polymers, and the polyolefin polymers made thereby.

9 Claims, 1 Drawing Sheet

(56) References Cited

U.S. PATENT DOCUMENTS

| | | | |
|---|---|---|---|
| 4,003,712 | A | 1/1977 | Miller |
| 4,011,382 | A | 3/1977 | Levine et al. |
| 4,293,673 | A | 10/1981 | Hamer et al. |
| 4,302,566 | A | 11/1981 | Karol et al. |
| 4,453,399 | A | 6/1984 | Thompson |
| 4,543,399 | A | 9/1985 | Jenkins, III et al. |
| 4,588,790 | A | 5/1986 | Jenkins, III et al. |
| 4,728,705 | A | 3/1988 | Nestlerode et al. |
| 4,771,024 | A | 9/1988 | Nestlerode et al. |
| 4,876,229 | A | 10/1989 | Furtek |
| 4,882,400 | A | 11/1989 | Dumain et al. |
| 4,988,783 | A | 1/1991 | Beran et al. |
| 4,994,534 | A | 2/1991 | Rhee et al. |
| 5,352,749 | A | 10/1994 | DeChellis et al. |
| 5,462,999 | A | 10/1995 | Griffin et al. |
| 5,541,270 | A | 7/1996 | Chinh et al. |
| 5,627,242 | A | 5/1997 | Jacobsen et al. |
| 5,665,818 | A | 9/1997 | Tilston et al. |
| 5,677,375 | A | 10/1997 | Rifi et al. |
| 6,228,792 | B1 | 5/2001 | Carney |
| 6,489,408 | B2 | 12/2002 | Mawson et al. |
| 6,982,237 | B2 | 1/2006 | Wagner et al. |
| 2004/0248729 | A1* | 12/2004 | Xiao ............ C08F 10/00 502/104 |
| 2006/0173123 | A1 | 8/2006 | Yang et al. |
| 2007/0060725 | A1 | 3/2007 | Zoeckler et al. |

FOREIGN PATENT DOCUMENTS

| | | |
|---|---|---|
| EP | 0794200 | 9/1997 |
| EP | 0802202 | 10/1997 |
| EP | 1016676 | 7/2000 |
| WO | 2006138036 | 12/2006 |
| WO | 2010125018 | 11/2010 |
| WO | 2017040127 | 3/2017 |
| WO | 2017151592 | 9/2017 |

OTHER PUBLICATIONS

Nichapat Senso, et al., The Influence of Mixed Activators on Ethylene Polymerization and Ethylene/1-Hexene Copolymerization with Silica-Supported Ziegler-Natta Catalyst, Molecules, 2010, vol. 15, pp. 9323-9339.

PCT/US2019/035919, International Preliminary Report on Patentability dated Dec. 15, 2020.

\* cited by examiner

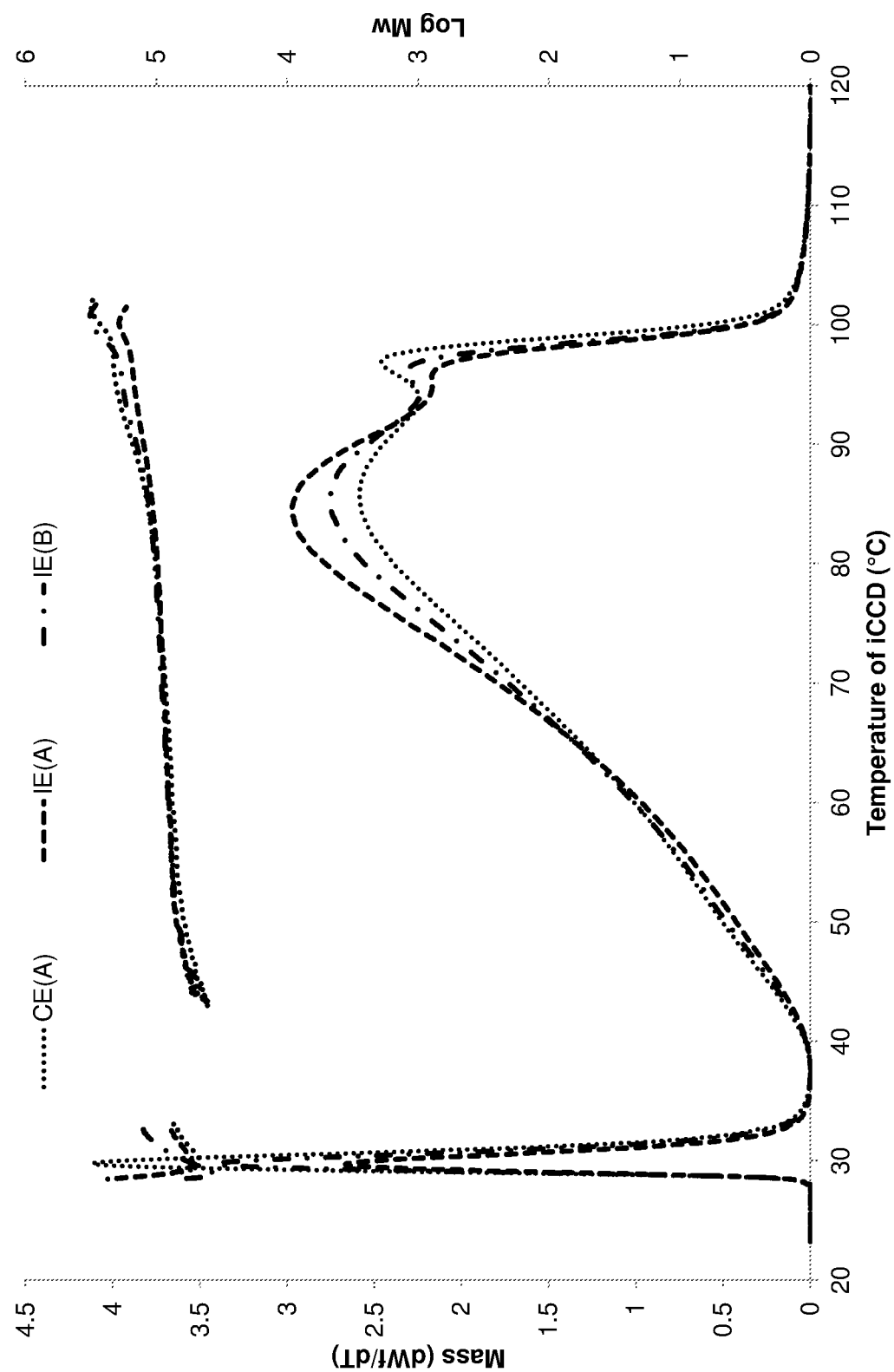

SPRAY-DRIED ZIEGLER-NATTA (PRO)CATALYST SYSTEMS

FIELD

Ziegler-Natta (pro)catalysts, methods of making and using same, and polyolefin polymer.

INTRODUCTION

Patent application publications in the field include WO 2006/138036 A1; WO 2010/125018 A1; WO 2017/040127 A1; and WO 2017/151592 A1. Patents in the field include U.S. Pat. Nos. 4,293,673; 4,728,705; 4,771,024; 4,876,229; 6,228,792 B1; and 6,982,237 B2.

Ziegler-Natta catalysts enhance rates of polymerization of olefin monomer(s) making polyolefin polymers. Typical Ziegler-Natta catalysts contain vanadium or titanium disposed on a support material such as $MgCl_2$, a divided solid that has high surface area. The titanium Ziegler-Natta catalyst is made by contacting a titanium(IV) compound (e.g., $TiCl_4$) with $MgCl_2$ and a reducing agent (e.g., trihexylaluminum) effective for chemically reducing the titanium(IV) compound to a titanium(III) compound (e.g., $TiCl_3$) so as to make a Ziegler-Natta procatalyst, and then contacting the Ziegler-Natta procatalyst with an activator (e.g., triethylaluminum) to increase catalytic activity thereof and thereby make the Ziegler-Natta catalyst. The reducing agent and activator differ from each other in composition and function.

Usually the Ziegler-Natta catalyst is provided as a constituent of a Ziegler-Natta catalyst system and its precursor Ziegler-Natta procatalyst is provided as a constituent of a precursor Ziegler-Natta procatalyst system. The "system" contains at least one additional component other than the Ziegler-Natta (pro)catalyst per se, reducing agent, or activator. Examples of the at least one additional component are an organic modifier and a carrier material.

The organic modifier may be an electron-donating compound such as an ether compound. The organic modifier may attenuate the catalytic activity or selectivity of the Ziegler-Natta (pro)catalyst of the Ziegler-Natta (pro)catalyst system, or may alter the composition or reactivity of the activator.

The carrier material is a particulate solid and may be porous, such as mesoporous, and thus may define exterior surfaces (outside of pores) and interior surfaces (inside pores). A typical carrier material is an alumina, a clay, or a silica. The carrier material's features such as size, shape, porosity, and surface chemistry thereof may control accessibility of the monomer(s) to the Ziegler-Natta catalyst of the Ziegler-Natta catalyst system containing the carrier material. The features may vary from carrier material to carrier material and their effects may vary from catalyst system type to catalyst system type depending on how the catalyst system is configured. This in turn largely depends upon the methods of preparing the carrier material and catalyst system and the composition and structure of the carrier material.

In supported Ziegler-Natta catalyst systems the carrier material may be mesoporous spheres of hydrophilic silica, which is untreated, amorphous and porous wherein the interior and exterior surfaces are hydrophilic. A supported Ziegler-Natta catalyst system generally may be made by a concentrating method comprising suspending the hydrophilic silica in a tetrahydrofuran solution of titanium tetrachloride and magnesium dichloride to form a suspension, concentrating the suspension under vacuum to give a precipitated intermediate, contacting the precipitated intermediate with a reducing agent to give a supported Ziegler-Natta procatalyst system, and contacting the supported Ziegler-Natta procatalyst system with an activator to give the supported Ziegler-Natta catalyst system. It is believed that the concentrating method results in the titanium tetrachloride/magnesium dichloride being precipitated inside the pores of the hydrophilic silica. After the chemically reducing and activating steps the pores contain most or all of the Ziegler-Natta catalyst. Thus, without wishing to be bound by theory, it is believed that the pores of the hydrophilic silica largely define the size and shape of, and control monomer access to the Ziegler-Natta catalyst in supported Ziegler-Natta catalyst systems. During polymerizations, ethylene and/or alpha-olefin may enter the pores of the hydrophilic silica in order to contact the Ziegler-Natta catalyst therein, and growth of polymer therein may be restricted by the mesopore diameters and pore volume. Commercial supported Ziegler-Natta catalyst systems include UCAT™ A from Univation Technologies, LLC.

In spray-dried Ziegler-Natta catalyst systems, the carrier material may be a hydrophobic fumed silica, which is amorphous and porous wherein the interior and exterior surfaces are hydrophobic. The spray-dried Ziegler-Natta catalyst systems may be made by a spray-drying method comprising suspending the hydrophobic fumed silica in a tetrahydrofuran solution of the titanium tetrachloride and magnesium dichloride to form a mixture, spray-drying the mixture to give a spray-dried intermediate, contacting the spray-dried intermediate with a reducing agent to give a spray-dried Ziegler-Natta procatalyst system, and contacting the spray-dried Ziegler-Natta procatalyst system with an activator to give the spray-dried Ziegler-Natta catalyst system. It is believed that the hydrophobic fumed silica and spray-drying method results in the hydrophobic pores of the spray-dried solid containing relatively little or none of the titanium tetrachloride/magnesium dichloride Ziegler-Natta catalyst, and after the chemically reducing and activating steps the pores contain little or none of the Ziegler-Natta catalyst, which instead largely resides on the exterior surfaces of the carrier material. Thus, without wishing to be bound by theory, it is believed that the exterior surfaces of the carrier material largely define the size and shape of, and control monomer access to, the Ziegler-Natta catalyst in spray-dried Ziegler-Natta catalyst systems. During polymerizations, ethylene and/or alpha-olefin may contact the Ziegler-Natta catalyst on the exterior surface of the silica, a polymer produced thereon may grow largely unrestricted by pore dimensions. Commercial spray-dried Ziegler-Natta catalyst systems include UCAT™ J from Univation Technologies, LLC.

A supported Ziegler-Natta procatalyst system may respond differently to different activators than the response of the spray-dried Ziegler-Natta procatalyst system. In turn the resulting supported Ziegler-Natta catalyst system may have different polymerization process characteristics (e.g., sensitivity to bed temperature, ethylene partial pressure, alpha-olefin/ethylene molar ratio, response to oxygen tailoring or hydrogen, if any, and catalyst productivity) than those of the resulting spray-dried Ziegler-Natta catalyst system. Consequently, performance of the respective catalyst systems and processes using same, and characteristics of the polyolefin polymers made therewith, are not inherently predictive of each other.

SUMMARY

We provide methods of making spray-dried Ziegler-Natta (pro)catalyst systems containing titanium Ziegler-Natta (pro)catalysts, a hydrophobic silica carrier material, and tetrahydrofuran. We also provide the spray-dried Ziegler-Natta (pro)catalyst systems made by the method. We also provide methods of polymerizing olefin (co)monomer(s) with the spray-dried Ziegler-Natta catalyst system to make polyolefin polymers, and the polyolefin polymers made thereby.

The spray-dried Ziegler-Natta catalyst system may enhance the reaction rate of the olefin polymerization process. The polyolefin polymers made by the process may have one or more improved properties such as, for example, narrower molecular weight distribution (molecular mass dispersity) and/or narrower comonomer composition distribution and/or narrower short chain branching distribution.

DRAWING(S)

FIG. 1 contains line plots of changes in weight percent (wt %) comonomer content of ethylene/alpha-olefin copolymer compositions on y-axis versus changes in LogM (by GPC) of the ethylene/alpha-olefin copolymer compositions on x-axis for each of inventive examples (A) and (B) ("IE(A)" and "IE(B)") and comparative example (A) ("CE(A)").

DETAILED DESCRIPTION

The Introduction, Summary and Abstract are incorporated here by reference.

Certain inventive embodiments are described below as numbered aspects for easy cross-referencing. Additional embodiments are described elsewhere herein.

Aspect 1. A method of making a spray-dried Ziegler-Natta procatalyst system, the method comprising: mixing a spray-dried particulate solid, consisting essentially of a hydrophobic fumed silica, $MgCl_2$, and THF, with a hydrocarbon liquid and one of titanium tetraisopropoxide ($Ti(OiPr)_4$) and ethylaluminum dichloride (EADC), but not both $Ti(OiPr)_4$ and EADC, to give an intermediate mixture consisting essentially of, or being a reaction product made from, the spray-dried particulate solid, hydrocarbon liquid, and either $Ti(OiPr)_4$ or EADC, but not both $Ti(OiPr)_4$ and EADC; and combining the intermediate mixture with the other one of the $Ti(OiPr)_4$ or EADC that was not used in the mixing step to give the spray-dried Ziegler-Natta procatalyst system. Prior to the mixing step, the spray-dried particulate solid is not in contact with either the $Ti(OiPr)_4$ or EADC. Prior to the mixing step, the spray-dried particulate solid is made by spray-drying a suspension of a hydrophobic fumed silica in a THF solution of $MgCl_2$. The hydrophobic fumed silica is made before the spray-drying step (and hence before the mixing and combining steps) by pre-treating a hydrophilic fumed silica with a hydrophobing agent.

Aspect 2. A method of making a spray-dried Ziegler-Natta catalyst system, the method comprising contacting the spray-dried Ziegler-Natta procatalyst system made by the method of aspect 1 with an activator to give the spray-dried Ziegler-Natta catalyst system. In some embodiments the contacting step and spray-dried Ziegler-Natta catalyst system is free of a hydrocarbon liquid. In other embodiments the contacting step and spray-dried Ziegler-Natta catalyst system includes the hydrocarbon liquid such that the activator is contacted with a suspension of the spray-dried Ziegler-Natta procatalyst system in the hydrocarbon liquid. In some aspects the method further comprises, after the contacting step, separating the spray-dried Ziegler-Natta catalyst system and the hydrocarbon liquid from each other to give the spray-dried Ziegler-Natta catalyst system as a dry particulate solid. The separating step may comprise spray-drying the suspension of the spray-dried Ziegler-Natta catalyst system in the hydrocarbon liquid to give the dry particulate solid. In other aspects the hydrocarbon liquid is a first hydrocarbon liquid and the method further comprises exchanging a second hydrocarbon liquid for the first hydrocarbon liquid to give a spray-dried Ziegler-Natta catalyst system that is suspended in the second hydrocarbon liquid and free of the first hydrocarbon liquid.

Aspect 3. The method of aspect 2 characterized by any one of limitations (i) to (viii): (i) wherein the hydrocarbon liquid is mineral oil; (ii) wherein the activator is a trialkylaluminum, alternatively a triethylaluminum; (iii) both (i) and (ii); (iv) wherein the hydrophobic fumed silica is a product of pre-treating a hydrophilic fumed silica (untreated) with a silicon-based hydrophobing agent; (v) wherein the hydrophobic fumed silica is a product of pre-treating a hydrophilic fumed silica (untreated) with a silicon-based hydrophobing agent selected from trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof; alternatively dimethyldichlorosilane; (vi) both (i) and (v); (vii) both (ii) and (v); and (viii) both (iii) and (v). Examples of the hydrophobic fumed silica are CAB-O-SIL hydrophobic fumed silicas available from Cabot Corporation, Alpharetta Ga., USA. In some aspects the activator is that used in any one of the inventive Examples described later and/or the hydrophobic fumed silica is that used in any one of the inventive Examples described later.

Aspect 4. The method of any one of aspects 1 to 3 further comprising, in a preliminary step before the mixing step, admixing the spray-dried particulate solid in the hydrocarbon liquid (e.g., mineral oil) to give an admixture of the spray-dried particulate solid consisting essentially of a hydrophobic fumed silica, $MgCl_2$, and tetrahydrofuran (THF) in a hydrocarbon liquid; and wherein the spray-dried particulate solid and hydrocarbon liquid used in the mixing step is supplied to the mixing step as the admixture. The admixture may then be used in the mixing step of aspect 1. Prior to the admixing step the spray-dried particulate solid is not in contact with the hydrocarbon liquid, e.g., the spray-dried particulate solid is a dry powder.

Aspect 5. The method of any one of aspects 1 to 4 further comprising, in a preliminary step before the mixing step and any admixing step, spray-drying a suspension of the hydrophobic fumed silica in a solution of magnesium dichloride ($MgCl_2$) in tetrahydrofuran (THF) to give the spray-dried particulate solid consisting essentially of the hydrophobic fumed silica, $MgCl_2$, and THF.

Aspect 6. A method of making a polyolefin polymer, the method comprising contacting an olefin monomer and optionally zero, one, or more olefin comonomer(s) with the spray-dried Ziegler-Natta catalyst system of any one of aspects 2 to 5 to give a polyolefin polymer comprising a polyolefin homopolymer or copolymer, respectively. The polyolefin polymer may also contain a residual amount of the spray-dried Ziegler-Natta catalyst system, or a by-product thereof. The by-product may be formed by quenching the residual spray-dried Ziegler-Natta catalyst system in the polyolefin polymer with a scavenger agent such as water.

Aspect 7. The method of aspect 6 wherein the polyolefin polymer is a polyethylene polymer, the method comprising contacting ethylene (monomer) and optionally zero, one, or more ($C_3$-$C_{20}$)alpha-olefins (comonomer(s)) with the spray-dried Ziegler-Natta catalyst system of any one of aspects 2 to 5 to give a polyethylene polymer comprising a polyethylene homopolymer or an ethylene/($C_3$-$C_{20}$)alpha-olefin copolymer, respectively. The polyethylene polymer may also contain a residual amount of the spray-dried Ziegler-Natta catalyst system, or the by-product thereof. The method may further comprise quenching (e.g., with a scavenger agent such as water or steam) the Ziegler-Natta catalyst of the spray-dried Ziegler-Natta catalyst system that is in the polyethylene polymer to give a composition comprising the polyethylene polymer and the by-products. The polyethylene homopolymer contains constituent units that are derived from ethylene. The ethylene/($C_3$-$C_{20}$)alpha-olefin copolymer contains monomeric constituent units that are derived from ethylene and comonomeric constituent units that are derived from one or more $C_3$-$C_{20}$)alpha-olefin comonomer(s), respectively. In some aspects the method comprises copolymerizing ethylene and one or more ($C_3$-$C_{20}$)alpha-olefin (comonomer(s)) to give the ethylene/($C_3$-$C_{20}$)alpha-olefin copolymer composition. The ($C_3$-$C_{20}$)alpha-olefin-derived comonomeric constituent units may be derived from 1-butene; alternatively, 1-hexene; alternatively, 1-octene; alternatively, a combination of any two thereof. The olefin polymerization process for manufacturing polyolefin polymers may be conducted in a gas phase or a liquid-phase.

Aspect 8. The method of aspect 7 comprising a gas phase polymerization of the ethylene and the $C_3$-$C_{20}$)alpha-olefin (e.g., one $C_3$-$C_{20}$)alpha-olefin, alternatively two different $C_3$-$C_{20}$)alpha-olefins) in the presence of molecular hydrogen gas ($H_2$) and, optionally, an induced condensing agent (ICA) in one, two or more gas phase polymerization reactors under polymerizing conditions, thereby making the polyethylene polymer; wherein the polymerizing conditions comprise a reaction temperature from 80 degrees (°) to 110° Celsius (C.); a molar ratio of the molecular hydrogen gas to the ethylene ($H_2/C_2$ molar ratio) from 0.0001 to 2.0, alternatively any one of the ranges of $H_2/C_2$ molar ratio described later, alternatively from 0.001 to 0.050; and a molar ratio of the comonomer to the ethylene (Comonomer/$C_2$ or $C_X/C_2$ molar ratio) from 0.001 to 0.8, alternatively any one of the ranges of $C_X/C_2$ molar ratio described later, alternatively from 0.005 to 0.10. In some aspects each ($C_3$-$C_{20}$)alpha-olefin may be a ($C_4$-$C_8$)alpha-olefin, e.g., 1-butene, 1-hexene, 1-octene, or a combination of any two thereof; alternatively, 1-butene or 1-hexene.

Aspect 9. The method of any one of aspects 6 to 8, the method comprising pre-mixing the spray-dried Ziegler-Natta catalyst system and with an activator (e.g., an alkylaluminum such as a trialkylaluminum such as triethylaluminum ("TEAl")) together for a pre-mixing period of time to make an activated catalyst system, and then injecting the activated catalyst system into the reactor, wherein the injected activated catalyst system contacts the olefin monomer and any olefin comonomer(s) to give a polyolefin homopolymer or copolymer, respectively. The pre-mixing period of time may be from 1 second to 10 minutes, alternatively from 30 seconds to 5 minutes, alternatively from 30 seconds to 2 minutes.

The method of any one of aspects 6 to 9 makes a polyolefin polymer. The polyolefin polymer may be any macromolecules capable of being made by a polymerization of an olefin monomer or a combination of olefin monomer and olefin comonomer(s) with the spray-dried Ziegler-Natta catalyst system. Examples of the polyolefin polymer are a polyethylene polymer, a polypropylene polymer, a poly($C_4$-$C_{20}$)alpha-olefin polymer, an ethylene-propylene copolymer, an ethylene-propylene-diene (EPDM) copolymer, or ethylene/unsaturated carboxylic ester copolymer. For space sake, the polymerization method and polyolefin polymer advantages and uses are illustrated from hereon with polyethylene polymers and the polyolefin polymer made by the method of any one of aspects 6 to 8 and the polyolefin polymer of aspect 9 is the polyethylene polymer.

It is believed that the performance of the inventive spray-dried Ziegler-Natta catalyst system in olefin polymerization would be enhanced relative to the performance of a comparative (non-inventive) spray-dried Ziegler-Natta catalyst system under the same olefin polymerization conditions, wherein the comparative spray-dried Ziegler-Natta catalyst system is made by contacting the aforementioned comparative spray-dried Ziegler-Natta procatalyst system with the activator. All other things being equal, the inventive spray-dried Ziegler-Natta catalyst system (inventive catalyst system) may have greater catalytic activity per unit weight of catalyst system and/or greater polymer productivity rate (kilograms polymer produced per hour) than would the comparative spray-dried Ziegler-Natta catalyst system having the same constituents and being prepared by a concentrating method instead of the present spray-drying method. The inventive catalyst system enhancement would be more pronounced if the inventive catalyst system is compared to a comparative supported Ziegler-Natta catalyst system prepared by a concentrating method.

In some embodiments the inventive catalyst productivity improvement of the inventive catalyst system independently is/are higher by at least 15%, alternatively at least 50%, alternatively at least 75%, alternatively at least 100%; and, in some embodiments, at most 200%, alternatively at most 150%, alternatively at most 110%, than the respective comparative catalyst productivity of the respective comparative catalyst system.

Alternatively or additionally, it is believed that the inventive polyethylene polymer, made with the inventive spray-dried Ziegler-Natta catalyst system under olefin polymerization conditions and characterized by a melt index ($I_2$) and density, would have one or more improved properties relative to a comparative polyethylene polymer made with the comparative spray-dried Ziegler-Natta catalyst system under the same olefin polymerization conditions and characterized by the same melt index ($I_2$) and density. When the polyethylene polymer is an ethylene/($C_4$-$C_8$)alpha-olefin copolymer, examples of such improved properties are a narrower molecular weight distribution (Mw/Mn), also referred to as narrower molecular mass dispersity ($M_w/M_n$), $Đ_M$; a narrower comonomer composition distribution (CCD); a narrower short chain branching distribution (SCBD); or any two or all thereof. In some aspects $Đ_M$ is from greater than 2.0 to less than 4.00, alternatively from greater than 3.0 to less than or equal to 3.74, alternatively from 3.50 to 3.70. The CCD is measured according to the CCD Test Method described later and the plot in FIG. 1 show the improvement (narrowing) of CCD. The inventive polyethylene polymer enhancement may be more pronounced if the inventive polyethylene polymer is compared to a comparative polyethylene polymer prepared with a comparative supported Ziegler-Natta catalyst system prepared by a concentrating method.

In a gas phase polymerization reaction, the inventive spray-dried Ziegler-Natta catalyst system may respond to a change in the aluminum/titanium (Al/Ti) molar ratio resulting in a change in catalyst productivity (CP) and/or resulting in a change in melt flow ratio ($I_{21}/I_2$) or settled bulk density (SBD) of the polyethylene polymer. This advantage enables tuning of the CP of the inventive spray-dried Ziegler-Natta catalyst system and/or tuning of the $I_{21}/I_2$ and/or SBD of the polyethylene polymer by adjusting the Al/Ti molar ratio.

The Al/Ti molar ratio may be adjusted by adjusting the amount of EADC used in the mixing or combining step of aspect 1 and dependent embodiments thereof. Advantageously, the extent or sensitivity of the inventive response to the change in Al/Ti ratio may be greater than a response of the comparative supported Ziegler-Natta catalyst system thereto. The effect on CP may be characterized by weight of polymer made versus weight of catalyst used versus Al/Ti molar ratio.

The response of the melt flow ratio ($I_{21}/I_2$) of the inventive polyethylene polymer to change in the Al/Ti molar ratio of the inventive spray-dried Ziegler-Natta catalyst system may be characterized by a slope of less than 0.02, alternatively less than 0.007 in a plot of $I_{21}/I_2$ on y-axis versus Al/Ti molar ratio on x-axis. In contrast the response of the melt flow ratio ($I_{21}/I_2$) of the comparative polyethylene polymer to change in the Al/Ti molar ratio of the comparative spray-dried Ziegler-Natta catalyst system may be characterized by a slope of more than 0.02, alternatively more than 0.0007 in a plot of $I_{21}/I_2$ on y-axis versus Al/Ti molar ratio on x-axis.

The response of the settled bulk density (SBD) of the inventive polyethylene polymer to change in the Al/Ti molar ratio of the inventive spray-dried Ziegler-Natta catalyst system may be characterized by a slope of less than −0.015 in a plot of SBD on y-axis versus Al/Ti molar ratio on x-axis. In contrast the response of the settled bulk density (SBD) of the comparative polyethylene polymer to change in the Al/Ti molar ratio of the comparative spray-dried Ziegler-Natta catalyst system may be characterized by a slope of more than −0.0015 in a plot of SBD on y-axis versus Al/Ti molar ratio on x-axis. Alternatively, the response of the settled bulk density (SBD) of the inventive polyethylene polymer to change in the Ti/Al molar ratio of the inventive spray-dried Ziegler-Natta catalyst system may be characterized by a slope of more than 250 in a plot of SBD on y-axis versus Ti/Al molar ratio on x-axis. In contrast the response of the settled bulk density (SBD) of the comparative polyethylene polymer to change in the Ti/Al molar ratio of the comparative spray-dried Ziegler-Natta catalyst system may be characterized by a slope of less than 250 in a plot of SBD on y-axis versus Ti/Al molar ratio on x-axis.

The response of the catalyst productivity (CP) of the inventive polyolefin (e.g., polyethylene) polymer to change in the Al/Ti molar ratio of the inventive spray-dried Ziegler-Natta catalyst system may be characterized by a slope of greater than 250 in a plot of CP as weight of polyethylene polymer made per weight of catalyst system used on y-axis versus Al/Ti molar ratio on x-axis. In contrast the response of the catalyst productivity (CP) of the comparative polyethylene polymer to change in the Al/Ti molar ratio of the comparative spray-dried Ziegler-Natta catalyst system is characterized by a slope of less than 25 in such a plot of CP versus Al/Ti molar ratio.

Alternatively, the response of the catalyst productivity (CP) of the inventive polyolefin (e.g., polyethylene) polymer to change in the Al/Ti molar ratio of the inventive spray-dried Ziegler-Natta catalyst system may be characterized by a piece-wise function with a slope of less than 300 at an Al/Ti molar ratio of 90 or less and a slope of less than 35 at an Al/Ti molar ratio of 90 or more in a plot of catalyst productivity (CP) as weight of polyethylene polymer made per weight of catalyst system used on the y-axis versus Al/Ti molar ratio on the x-axis. In contrast the response of the CP of the comparative polyethylene polymer to change in the Al/Ti molar ratio of the comparative spray-dried Ziegler-Natta catalyst system is characterized by a piece-wise function with a slope of more than 300 at an Al/Ti molar ratio of 35 or less and a slope of 0 or less at an Al/Ti of 35 or more.

In some aspects inventive polyolefin polymer is made by contacting the inventive catalyst system and aluminum alkyl activator (e.g., triethylaluminum or TEAl) in situ in the reactor in the presence of olefin monomer (e.g., ethylene and alpha-olefin) and growing polymer chains. These embodiments may be referred to herein as in situ-contacting embodiments.

In other aspects (e.g., aspect 9) the inventive catalyst system and aluminum alkyl activator (e.g., triethylaluminum or TEAl) are pre-mixed together for a period of time to make an activated catalyst system, and then the activated catalyst system is injected into the reactor, where it contacts the olefin monomer and growing polymer chains. These embodiments pre-contact the inventive catalyst system and aluminum alkyl activator together in the absence of olefin monomer (e.g., in absence of ethylene and alpha-olefin) and growing polymer chains, i.e., in an inert environment, and are referred to herein as pre-contacting embodiments. The pre-mixing period of time of the pre-contacting embodiments may be from 1 second to 10 minutes, alternatively from 30 seconds to 5 minutes, alternatively from 30 seconds to 2 minutes.

The inventive polyolefin polymer made by the pre-contacting embodiments may be characterized by an increase of its settled bulk density (SBD) relative to SBD of an inventive polyolefin polymer made by the in situ-contacting embodiments, all other things being equal (e.g., same reactor conditions). Without being bound by theory, it is believed that the activation of the inventive catalyst system in an inert environment of the pre-contacting embodiment and before injection thereof into the reactor changes the polymerization reaction kinetics in the reactor and results in an inventive polyolefin polymer having a narrower particle size distribution relative to particle size distribution of the inventive polyolefin polymer made by an in situ-contacting embodiment. Additionally, without being bound by theory, it is believed that the extent of the increase in SBD may be controlled or adjusted by changing any one or more of the following process conditions in the reactor: the concentration of inventive catalyst system, the concentration of aluminum alkyl activator, pre-contacting Ti/Al molar ratio, total reactor Al/Ti molar ratio, and the time period of pre-mixing. For example, a pre-contacting embodiment comprising pre-mixing the inventive catalyst system and aluminum alkyl activator together for approximately 1 minute (period of pre-mixing) will result in an increase in SBD of the inventive polyolefin polymer up of an amount to at least 96 kilograms per cubic meter ($kg/m^3$) (i.e., at least 6 pounds per cubic foot or $lb/ft^3$). A comparative example (e.g., CE(B) described later) showed no increase in SBD at various pre-contacting Ti/Al molar ratios, total reactor Al/Ti molar ratios, or pre-mixing time periods. Additionally, with less than 10 wt % aluminum alkyl activator and approximately 1 minute pre-mixing time, a plot of the SBD on the y-axis of the inventive polyolefin polymer made by the pre-contacting method versus the Ti/Al molar ratio of pre-contacted catalyst system and activator on the x-axis may be characterized by a slope of less than −80. In contrast, comparative example (e.g., CE(B)) showed no response of the SBD to change in the Ti/Al molar ratio of pre-mixed catalyst system and activator.

Definitions

Anhydrous: lacking $H_2O$ (i.e., having 0.00 wt % $H_2O$), alternatively having from >0.00 wt % to less than 0.05 wt %, alternatively less than 0.01 wt %, alternatively less than 0.001 wt % H$_2$O. Anhydrous form of material may be obtained from commercial sources or prepared by removing water from a water-containing form of the material using drying methods, which are well-known in the art.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s). The method gradually removes more of the more volatile chemical constituent(s) than the less volatile constituent(s) from the continuous mixture to give a concentrate having a higher mass or molar amount of the less volatile chemical constituent(s) per unit volume than did the continuous mixture. The concentrate may be a precipitated solid.

Consisting essentially of, consist(s) essentially of, and the like. Partially-closed ended expressions that exclude anything that would affect the basic and novel characteristics of that which they describe, but otherwise allow anything else.

Consisting of and consists of. Closed ended expressions that exclude anything that is not specifically or explicitly described by the limitation that it modifies. In some aspects any one, alternatively each expression "consisting essentially of" or "consists essentially of" may be replaced by the expression "consisting of" or "consists of", respectively.

Dry. Anhydrous. A moisture content from 0 to less than 5 parts per million based on total parts by weight. Materials fed to the reactor(s) during a polymerization reaction are dry.

Effective amount: a quantity sufficient to achieve an intended and appreciable result.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Fumed silica, hydrophobic pre-treated: a reaction product of contacting a hydrophilic fumed silica (untreated) with a hydrophobing agent to react with surface hydroxyl groups on the hydrophilic fumed silica, thereby modifying the surface chemistry of the hydrophilic fumed silica to give a hydrophobic fumed silica. The hydrophobing agent may be silicon based.

Fumed silica, hydrophilic (untreated): pyrogenic silica produced in a flame. Consists of amorphous silica powder made by fusing microscopic droplets into branched, chain-like, three-dimensional secondary particles, which agglomerate into tertiary particles. Not quartz. Untreated means not treated with a hydrophobing agent.

Hydrophobing agent: an organic or organosilicon compound that forms a stable reaction product with surface hydroxyl groups of fumed silica.

Induced condensing agent (ICA): An inert liquid useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to the purge gas or ethylene feed means a molecular oxygen (O$_2$) content from 0 to less than 5 parts per million based on total parts by weight of the purge gas or ethylene feed.

Mesoporous: having an average pore diameter of from 2 to 50 nanometers (nm).

Microporous: having an average pore diameter of less than 2 nm.

Modifier (compound): a composition that alters reactivity, stability, or both of a substance on which the composition acts. Organic modifier—the composition is an organic composition.

Polyethylene polymer: A macromolecule, or collection of macromolecules, composed of constitutional units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such constitutional units are derived from ethylene monomer; and, in aspects wherein there are less than 100 mol % ethylenic constitutional units, the remaining constitutional units are comonomeric units derived from at least one C$_3$-C$_{20}$)alpha-olefin; or collection of such macromolecules.

Polymerize: make a polymer by reacting monomer molecules together or make a copolymer by reacting together monomer molecules and molecules of at least one comonomer.

(Pro)catalyst: a procatalyst, a catalyst, or a combination of procatalyst and catalyst.

Quartz: an untreated, nonporous crystalline form of silicon dioxide. Particulate or bulk.

Silica. A particulate form of silicon dioxide that may be amorphous. Crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas. The particle size and shape of the particulate solid formed by spray-drying may be different than those of a precipitated solid.

System (chemistry): an interrelated arrangement of different chemical constituents so as to form a functioning whole.

Transport: move from place to place. Includes from reactor to reactor, tank to reactor, reactor to tank, and manufacturing plant to storage facility and vice versa.

Ziegler-Natta (pro)catalysts and Ziegler-Natta (pro)catalyst systems. See Introduction for general descriptions. All of these forms generally fall into the heterogeneous class of Ziegler-Natta (pro)catalysts and systems because they constitute a solid phase in a gas- or liquid-phase olefin polymerization reaction.

Materials

Activator. The activator may comprise a (C$_1$-C$_4$)alkyl-containing aluminum compound. The (C$_1$-C$_4$)alkyl-containing aluminum compound may independently contain 1, 2, or 3 (C$_1$-C$_4$)alkyl groups and 2, 1, or 0 groups each independently selected from chloride atom and (C$_1$-C$_4$)alkoxide. Each C$_1$-C$_4$)alkyl may independently be methyl; ethyl; propyl; 1-methylethyl; butyl; 1-methylpropyl; 2-methylpropyl; or 1,1-dimethylethyl. Each (C$_1$-C$_4$)alkoxide may independently be methoxide; ethoxide; propoxide; 1-methylethoxide; butoxide; 1-methylpropoxide; 2-methylpropoxide; or 1,1-dimethylethoxide. The (C$_1$-C$_4$)alkyl-containing aluminum compound may be triethylaluminum (TEA), tri-isobutylaluminum (TIBA), diethylaluminum chloride (DEAC), diethylaluminum ethoxide (DEAE), ethylaluminum dichloride (EADC), or a combination or mixture of any two or more thereof. The activator may be triethylaluminum (TEA), triisobutylaluminum (TIBA), diethylaluminum chloride (DEAC), diethylaluminum ethoxide (DEAE), or ethylaluminum dichloride (EADC).

($C_3$-$C_{20}$)alpha-olefin. A compound of formula (I): $H_2C$=$C(H)$—R (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. Prior to treatment with the hydrophobing agent, the carrier material is hydrophilic silica (untreated) and has variable surface area and average particle size. In some embodiments, the surface area is from 50 to 150 square meter per gram ($m^2$/g). The average particle size may be less than 1 micrometer (μm). Each of the above properties are measured using conventional techniques known in the art. The hydrophilic silica may be amorphous silica (not quartz), alternatively an amorphous silica, alternatively a fumed silica. Such silicas are commercially available from a number of sources. The silica may be in the form of spherical particles, which are obtained by a spray-drying process. The hydrophilic silica may be calcined (i.e., dehydrated) or not calcined prior to treatment with the hydrophobing agent.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of hydrophilic fumed silica to form Si—O—Si linkages with loss of water molecule as a byproduct. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the $C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Spray-dried Ziegler-Natta (pro)catalyst systems. Generically includes spray-dried Ziegler-Natta procatalyst system, chemically-reduced, spray-dried Ziegler-Natta procatalyst system, and spray-dried Ziegler-Natta catalyst system. Although each form of the spray-dried Ziegler-Natta (pro)catalyst systems may have catalytic activity in olefin polymerization reactions, the activated form usually has much greater catalytic activity and polymer productivity than those of the respective unreduced procatalyst and reduced procatalyst precursors. All conditions being equal, the catalytic activity and polymer productivity of such reactions may vary from embodiment to embodiment of the spray-dried Ziegler-Natta (pro)catalyst system. Such variations are within the ordinary skill of an artisan to control and may depend upon the particular composition and construction of the spray-dried Ziegler-Natta (pro)catalyst system. The relevant composition factors include loadings of Ti and Mg and molar ratio of Mg to Ti ("mag-tie ratio"). The relevant construction factors include average primary particle size; primary particle size distribution; particle agglomeration; and particle or agglomerate shape of the Ziegler-Natta catalyst particles. The carrier material and catalyst system preparation method described above further define these construction factors.

The spray-dried Ziegler-Natta (pro)catalyst systems independently may be in the form of a dry powder or a suspension or slurry in a saturated and/or aromatic hydrocarbon solvent. The saturated and/or aromatic hydrocarbon solvent may aid handling of the (pro)catalyst system. The saturated and/or aromatic hydrocarbon solvent may be an alkane or an alkyl-substituted benzene (toluene or xylenes).

The spray-dried Ziegler-Natta (pro)catalyst system independently may be characterized by any one of limitations (i) to (x): (i) a Mg atom loading of from 2.0 to 10.0 weight percent (wt %), alternatively from 6.0 to 8.5 wt %, alternatively from 6.5 to 8.0 wt %, based on total weight of the ad rem system; (ii) a Mg atom concentration of from 0.82 to 4.11 millimoles Mg atom per gram of the ad rem system (mmol/g), alternatively from 2.0 to 4.0 mmol/g, alternatively 2.47 to 3.50 mmol/g, alternatively from 2.67 to 3.29 mmol/g; (iii) a Ti atom loading of from 0.5 to 5.0 wt %, alternatively from 1.0 to 4.0 wt %, alternatively from 1.5 to 3.5 wt %, based on total weight of the ad rem system; (iv) a Ti atom concentration of from 0.10 to 1.04 millimoles Ti atom per gram of the ad rem system (mmol/g), alternatively from 0.21 to 0.84 mmol/g, alternatively from 0.25 to 0.80 mmol/g, alternatively from 0.31 to 0.73 mmol/g; (v) a Mg atom-to-Ti atom molar ratio from 0.79 to 39.4, alternatively from 2.95 to 16.7, alternatively from 3.0 to 15, alternatively from 3.66 to 10.5; (vi) a loading of the tetrahydrofuran modifier of from 15 to 45 wt %, alternatively from 18 to 39 wt %, alternatively from 20.0 to 35.0 wt %, based on weight of the spray-dried Ziegler-Natta (pro)catalyst system; (vii) both (i) and (ii); (viii) both (i) and (iii); (ix) both (i) and (iv); (x) both (i) and (v); (xi) both (i) and (vi); (xii) both (ii) and (iii); (xiii) both (ii) and (iv); (xiv) both (ii) and (v); (xv) both (ii) and (vi); (xvi) both (iii) and (iv); (xvii) both (iii) and (v); (xviii) both (iii) and (vi); (xix) both (iv) and (v); (xx) both (iv) and (vi); (xxi) both (v) and (vi); (xxii) both (vii) and any one of (viii) to (xxi); (xxiii) both (viii) and any one of (ix) to (xxi); (xxiv) both (ix) and any one of (x) to (xxi); (xxv) both (x)

and any one of (xi) to (xxi); (xxvi) both (xi) and any one of (xii) to (xxi); (xxvii) both (xii) and any one of (xiii) to (xxi); (xxviii) both (xiii) and any one of (xiv) to (xxi); (xxix) both (xiv) and any one of (xv) to (xxi); (xxx) both (xv) and any one of (xvi) to (xxi); (xxxi) both (xvi) and any one of (xvii) to (xxi); (xxxii) both (xvii) and any one of (xviii) to (xxi); (xxxiii) both (xviii) and any one of (xix) to (xxi); (xxxiv) both (xix) and any one of (xx) and (xxi); (xxxv) both (xx) and (xxi). The THF may function as an organic modifier and as such may attenuate the catalytic activity or selectivity of the Ziegler-Natta catalyst of the Ziegler-Natta catalyst system, such as a function of reaction temperature, or may alter the composition or reactivity of the activator with the Ziegler-Natta procatalyst of the spray-dried Ziegler-Natta procatalyst system.

The spray-dried Ziegler-Natta (pro)catalyst systems independently may be made, prepared, reacted, reduced, activated, modified, handled, stored, and transported under conditions suitable for the particular purpose. Such conditions include reaction conditions, storage conditions and transportation conditions. Such conditions are generally well-known in the art. For example, the spray-dried Ziegler-Natta (pro)catalyst systems independently may be made, prepared, reacted, reduced, activated, modified, handled, stored, and transported under an inert atmosphere such as a gas composed of anhydrous $N_2$, He, and/or Ar; and/or in a saturated and/or aromatic hydrocarbon solvent such as those described herein. Such conditions may include well-known techniques for such systems such as Schlenk line techniques.

Without wishing to be bound by theory it is believed that the oxidation state of the titanium of the $Ti(OiPr)_4$ is reduced by the EADC during the combining step (aspect 1). The titanium of the $Ti(OiPr)_4$ is formally $Ti^{+4}$ and the titanium of the spray-dried Ziegler-Natta procatalyst system may be formally $Ti^{+3}$. It is also believed that the spray-dried Ziegler-Natta procatalyst system prepared by the method is different in at least one of composition, reactivity with activator, and structure than a comparative spray-dried Ziegler-Natta procatalyst system that has been prepared by first mixing the $Ti(OiPr)_4$ and EADC in the absence of the hydrophobic fumed silica and/or a $MgCl_2$/THF to give a comparative reaction product, and then mixing the comparative reaction product with the hydrophobic fumed silica and/or a $MgCl_2$/THF to give the comparative spray-dried Ziegler-Natta procatalyst system. In some aspects the method further comprises, after the combining step, separating the spray-dried Ziegler-Natta procatalyst system and the hydrocarbon liquid from each other to give the spray-dried Ziegler-Natta procatalyst system as a dry particulate solid. The separating may comprise spray-drying the suspension of the spray-dried Ziegler-Natta procatalyst system in the hydrocarbon liquid to give the dry particulate solid. In other aspects the hydrocarbon liquid is a first hydrocarbon liquid and the method further comprises exchanging a second hydrocarbon liquid for the first hydrocarbon liquid to give a spray-dried Ziegler-Natta procatalyst system that is suspended in the second hydrocarbon liquid and free of the first hydrocarbon liquid.

Spray Drying

Any spray-drying step herein may be performed until a dried particulate solid having a constant weight is obtained. Suitable spray-drying conditions are described later in the Examples. The spray-drying from THF may be done at a temperature from 30 degrees Celsius (° C.) to the boiling point of the THF, alternatively from 50° to 65° C., alternatively from 58° to 62° C., alternatively 60° C. The spray-drying from THF may be done for a period of time from 10 to 120 minutes, alternatively from 45 to 90 minutes, alternatively from 50 to 70 minutes, alternatively 60 minutes. The spray-drying from the hydrocarbon liquid may be done at a temperature from 30 degrees Celsius (° C.) to the boiling point of the hydrocarbon liquid, alternatively from 80° to 165° C., alternatively from 95° to 105° C. The spray-drying from the hydrocarbon liquid may be done for a period of time from 1 to 48 hours, alternatively from 3 to 30 hours, alternatively from 4 to 12 hours, alternatively 5 hours. Carrier material of the spray-dried Ziegler-Natta procatalyst system consists essentially of, alternatively consists of, the hydrophobic fumed silica, which means it contains from 0 to 5 weight percent (wt %), alternatively 0 to 0.9 wt %, alternatively 0 to 0.09 wt %, alternatively 0 wt % porous silica. Without wishing to be bound by theory, we believe that the exterior surfaces of the hydrophobic fumed silica largely define the construction of the spray-dried Ziegler-Natta procatalyst system.

Polymerization Types

The spray-dried Ziegler-Natta catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

Polymerization Reactors

The polymerization may be conducted in a high pressure, liquid phase or gas phase polymerization reactor to yield the inventive polyethylene polymer. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

In an illustrative embodiment the polymerization method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel through a cycle loop down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The spray-dried Ziegler-Natta catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

Polymerization Conditions

Polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene polymer.

At least one, alternatively each of the polymerizing conditions may be fixed (i.e., unchanged) during production of the inventive polyethylene polymer. Such fixed polymerizing conditions may be referred to herein as steady-state polymerizing conditions. Steady-state polymerizing conditions are useful for continuously making embodiments of the inventive polyethylene polymer having same polymer properties.

Alternatively, at least one, alternatively two or more of the polymerizing conditions may be varied within their defined operating parameters during production of the inventive polyethylene polymer in order to transition from the production of a first embodiment of the inventive polyethylene polymer having a first set of polymer properties to a non-inventive polyethylene polymer or to a second embodiment of the inventive polyethylene polymer having a second set of polymer properties, wherein the first and second sets of polymer properties are different and are each within the limitations described herein for the inventive polyethylene polymer. For example, all other polymerizing conditions being equal, a higher molar ratio of $C_3$-$C_{20}$)alpha-olefin comonomer/ethylene feeds in the inventive method of copolymerizing produces a lower density of the resulting product inventive polyethylene polymer. Transitioning from one set to another set of the polymerizing conditions is permitted within the meaning of "polymerizing conditions" as the operating parameters of both sets of polymerizing conditions are within the ranges defined therefore herein. A consequence of the transitioning is that any described property value for the inventive polyethylene polymer may be achieved by a person of ordinary skill in the art in view of the teachings herein.

The polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The polymerizing conditions may further include using molecular hydrogen ($H_2$) to control final properties of the polyethylene polymer. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), hydrogen to ethylene ($H_2/O_2$), or hydrogen to comonomer ($H_2/\alpha$-olefin) may be from 0.0001 to 10, alternatively 0.0005 to 5, alternatively 0.001 to 3, alternatively 0.001 to 0.10.

The polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia =6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio $C_X/C_2$ of comonomer ($C_X$) and ethylene ($C_2$) being fed into the FB-GPP reactor may be from 0.0001 to 0.8, alternatively from 0.0001 to 0.1, alternatively from 0.0002 to 0.05, alternatively from 0.0004 to 0.02, alternatively from 0.0006 to 0.8, alternatively from 0.002 to 0.02. Subscript x indicates the number of carbon atoms per comonomer molecule and may be an integer from 3 to 20, alternatively 4, 6, or 8.

Ethylene partial pressure in the FB-GPP reactor. From 415 to 2070 kilopascals (kPa, i.e., from 60 to 300 psia (pounds per square inch absolute)); alternatively, from 690 to 2070 kPa (100 to 300 psia); alternatively, from 830 to 1655 kPa (120 to 240 psia), alternatively, from 1300 to 1515 kPa (190 to 220 psia). Alternatively, the partial pressure of ethylene may be from 690 to 3450 kilopascals (kPa, 100 to 500 pounds per square inch absolute (psia)), alternatively, 1030 to 2070 kPa (150 to 300 psia), alternatively, 1380 to 1720 kPa (200 to 250 psia), alternatively, 1450 to 1590 kPa (210 to 230 psia), e.g., 1520 kPa (220 psia). 1.000 psia = 6.8948 kPa.

Hydrogen to ethylene ($H_2/C_2$) gas molar ratios in the FB-GPP reactor may be from 0.0001 to 2.0, alternatively from 0.0001 to 0.40, alternatively from 0.0001 to 0.25, alternatively from 0.0005 to 0.200, alternatively from 0.005 to 0.149, alternatively from 0.009 to 0.109, alternatively from 0.010 to 0.100.

Oxygen ($O_2$) concentration relative to ethylene ("$O_2/C_2$", volume parts $O_2$ per million volume parts ethylene (ppmv)) in the FB-GPP reactor. Typically, oxygen is not purposely introduced into the FB-GPP reactor. In some embodiments the FB-GPP reactor is substantially free or free of $O_2$, e.g., the $O_2/O_2$ is 0.0000 to 0.0001 ppmv, alternatively 0.0000 ppmv.

Reactor bed temperature in the FB-GPP reactor may be from 60° to 120° C., alternatively from 60° to 85° C., alternatively from 80° to 120° C., alternatively from 80° to 90° C., alternatively from 90° to 120° C., alternatively from 95° to 115° C., alternatively from 99° to 110° C., alternatively from 100.0° to 109° C., alternatively from 87.0° to 89° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

Gas Phase Reactor and Polymerization Method Start-Up or Restart

Start-up or restart of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed pre-loaded or loaded, respectively, into the fluidized bed reactor. The polymer seedbed may be composed of powder of a polyethylene polymer such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively, the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the spray-dried Ziegler-Natta catalyst system.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pennsylvania, USA. ISO means the standards organization, International Organization for Standardization, Geneva, Switzerland. Any comparative example is used for illustration purposes only and shall not be deemed prior art. Free of or lacks means a complete absence of; alternatively, not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Ranges include endpoints, subranges, and whole and/or fractional values subsumed therein, except a range of integers does not include fractional values. Room temperature: 23° C.±1° C.

Test Methods

Catalyst Productivity Test Method: calculated as kilograms polymer resin made per kilogram of catalyst used ("kg copolymer/kg catalyst" or, simply, "kg/kg"). The calculation of kilogram of catalyst used is based on amount of titanium in polymer as measured by X-ray Fluorescence Spectrometry ("Ti IXRF") or by Inductively Coupled Plasma Optical Emission Spectrometry ("Ti ICPES"). Alternatively, catalyst productivity can be calculated as a ratio of the rate of polyolefin resin production in the reactor to the rate of catalyst addition to the reactor (e.g., kg resin production per hour divided by kg catalyst added per hour). Catalyst productivity may be expressed as a range from kg/kg (determined by Ti IXRF) to kg/kg (determined by Ti ICPES) to kg/kg (determined by material balance).

Comonomer Composition Distribution (CCD) Test Method: measured according to the CCD test method of WO 2017/040127 A1.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Flow Index (190° C., 21.6 kg, "FI$_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.) or the equivalent in decigrams per 1.0 minute (dg/1 min.).

Flow Rate (190° C., 5.0 kilograms (kg), "I$_5$") Test Method: for ethylene-based polymer is measured according to ASTM D1238-13, using conditions of 190° C./5.0 kg, formerly known as "Condition E" and also known as I$_5$. Report results in units of grams eluted per 10 minutes (g/10 min.) or the equivalent in decigrams per 1.0 minute (dg/1 min.).

Flow Rate Ratio (190° C., "I$_{21}$/I$_5$") Test Method: calculated by dividing the value from the Flow Index I$_{21}$ Test Method by the value from the Flow Rate I$_5$ Test Method. Unitless.

Fluidized Bulk Density (FBD) Test Method: defined as weight of solids per unit volume of a fluidized bed at a given superficial gas velocity (SGV). FBD (uncorrected)=($\Delta$P*S)/(S1*H), wherein $\Delta$P is the pressure drop between bottom and middle taps in pounds per square inch (lb/in$^2$ or psi), S represents the cross-sectional area of the reactor in square inches (in$^2$), S1 represents the cross-sectional area of the reactor in square feed (ft$^2$), and H represents the distance between the bottom and middle taps in feet (ft). The FBD (uncorrected) is corrected to an actual value (FBD (corrected)) based on reactor pressure and temperature and gas density. The units of FBD (corrected) may be converted to kilograms per cubic meter (kg/m$^3$).

Gel permeation chromatography (GPC) Test Method: Weight-Average Molecular Weight Test Method: determine M$_w$, number average molecular weight (M$_n$), and M$_w$/M$_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate M$_w$ and M$_n$ using universal calibration relationships with the column calibrations. Calculate MW at each elution volume with following equation:

$$\log M_X = \frac{\log(K_X/K_{PS})}{a_X + 1} + \frac{a_{PS}+1}{a_X+1}\log M_{PS},$$

where subscript "X" stands for the test sample, subscript "PS" stands for PS standards, a$_{PS}$=0.67, K$_{PS}$=0.000175, and a$_X$ and K$_X$ are obtained from published literature. For polyethylene polymers, a$_X$/K$_X$=0.695/0.000579. For polypropylenes a$_X$/K$_X$=0.705/0.0002288. At each point in the resulting chromatogram, calculate concentration, c, from a baseline-subtracted DRI signal, I$_{DRI}$, using the following equation: c=K$_{DRI}$I$_{DRI}$/(dn/dc), wherein K$_{DRI}$ is a constant determined by calibrating the DRI, / indicates division, and dn/dc is the refractive index increment for the polymer. For polyethylene polymer, dn/dc =0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

Melt Flow Ratio (190° C., "I$_{21}$/I$_2$") Test Method: calculated by dividing the value from the Flow Index I$_{21}$ Test Method by the value from the Melt Index I$_2$ Test Method. Unitless.

Melt Index (190° C., 2.16 kilograms (kg), "I$_2$") Test Method: for ethylene-based polymer is measured according to ASTM D1238-13, using conditions of 190° C./2.16 kg, formerly known as "Condition E" and also known as I$_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene polymer, although the inverse proportionality is not linear. Thus, the higher the molecular weight, the lower the melt index.

1% or 2% Secant Modulus Test Method: measured according to ASTM D882-12, *Standard Test Methods for Tensile Properties of Thin Plastic Sheeting*. Used either 1% or 2% secant modulus in cross direction (CD) or machine direction (MD). Report results in megapascals (MPa). 1,000.0 pounds per square inch (psi)=6.8948 MPa.

Settled Bulk Density (SBD) Test Method: is defined as weight of material per unit volume. SBD is measured by pouring under gravity an amount of polymer resin to overflow a tared 400 cubic centimeter (cm$^3$) volume cylinder after excess of polymer resin is removed by sliding a straight edge across the top of the cylinder. The resulting level full cylinder is weighed, the tare weight of the cylinder is subtracted, and the resulting resin weight is divided by the cylinder volume to get SBD in pounds per cm$^3$, which value may be converted to pounds per cubic foot (lb/ft$^3$) or to kilograms per cubic meter (kg/m$^3$).

Tensile Modulus Test Method: measured according to ASTM D882-12, *Standard Test Methods for Tensile Prop-* erties of Thin Plastic Sheeting. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Materials Used in Examples

1-Butene ("C4"): comonomer of formula $H_2C=C(H)CH_2CH_3$; used at the molar ratio of C4/C2 in Tables 1 and 2.

Diethylaluminum chloride: obtained from Albemarle Corporation.

Ethylaluminum dichloride (EADC): obtained from Albemarle Corporation.

Ethylene ("C2"): a compound of formula $H_2C=CH_2$. Monomer used at the partial pressure of C2 in Tables 1 and 2.

Isopentane: a compound of formula $(H_3C)_2C(H)CH_2CH_3$. An induced condensing agent 1 ("ICA1"); used at the mole percent (mol %) concentration in the gas phase of a gas phase reactor relative to the total molar content of gas phase matter in Tables 1 and 2.

Molecular hydrogen gas ("$H_2$"): used at a molar ratio of $H_2/C_2$ in Tables 1 and 2.

Magnesium dichloride: a support material; obtained from SRC Worldwide Inc.

Mineral oil: HB-380 mineral oil from Sonnenborn LLC, Parsippany, N.J., USA.

Hydrophobic fumed silica 1: a carrier material; a low surface area fumed silica that has been with dimethyldichlorosilane obtained as TS-610 from Cabot Corporation.

Tetrahydrofuran: anhydrous; obtained from Pride Chemical Solution.

Titanium tetraisopropoxide (i.e., titanium tetra(1-methylethoxide) or $Ti(OiPr)_4$): obtained from WR Grace.

Titanium trichloride.AA ($TiCl_3.AA$): obtained from WR Grace. The $TiCl_3.AA$ means a mixture of a 3:1 molar ratio of $TiCl_3/AlCl_3$. Alternatively, the $TiCl_3.AA$ may be made by a reaction of 3 mole equivalents of $TiCl_4$ with one mole equivalent of aluminum (Al) metal ($Al^0$), which acts as a reducing agent, in a solvent, such as anhydrous tetrahydrofuran.

Triethylaluminum ("TEAl"): an activator; obtained from Albermarle or Akzo.

Trihexylaluminum ("TnHal"): a reducing agent; obtained from Albermarle or Akzo. Also known is tri-n-hexylaluminum.

EXAMPLES

Preparation 1 (Prep1): synthesis of a spray-dried particulate solid consisting essentially of a hydrophobic fumed silica, $MgCl_2$, and THF. Add anhydrous tetrahydrofuran (14 kg) to a feed tank. Next add finely-divided solid $MgCl_2$ (1255 g). Heat mixture to 60° C., and mix it for 5 hours to overnight to form a solution. Cool the solution to 40° C. to 45° C. Then add hydrophobic fumed silica (Cabosil TS-610, 1.6 kg) to give a suspension. Mix the suspension for 30 minutes to give a slurry of a hydrophobic fumed silica in a THF solution of $MgCl_2$. Spray the slurry in a spray dryer using the following conditions: inlet temperature 160 C, outlet temperature 110° C., feed rate approximately 45 kg per hour, total gas flow approximately 270 kg per hour, atomizer speed: varied typically approximately 85%, to give the spray-dried particulate solid of Prep1, having expected d50 particle size from 18 to 25 micrometers.

Inventive Example 1a (IE1a): synthesis of a spray-dried Ziegler-Natta procatalyst system. Mix 150 g of the spray-dried particulate solid of Prep1, 520 g of a mineral oil, and 8.7 g of $Ti(OiPr)_4$ at 30° C. for 0.5 hour to give an intermediate mixture consisting essentially of, or being a reaction product made from, the spray-dried particulate solid, mineral oil, and $Ti(OiPr)_4$. The intermediate mixture is free of EADC. Then combine the intermediate mixture with 73.5 g of EADC at 30° C. for 2 hours to give the spray-dried Ziegler-Natta procatalyst system of IE1a in mineral oil.

Inventive Example 1b (IE1b): synthesis of a spray-dried Ziegler-Natta catalyst system. Contact the spray-dried Ziegler-Natta procatalyst system of IE1a in mineral oil with triethylaluminum (TEAl) at 30° C. for 0.02 hour to give the spray-dried Ziegler-Natta catalyst system of IE1b in mineral oil. Al/Ti molar ratio based on TEAl feed=22.72. Al/Ti molar ratio based on X-ray diffraction=29.57.

Inventive Example 1c (IE1c): synthesis of a spray-dried Ziegler-Natta catalyst system. Replicate the procedure of IE1b except use a higher amount of triethylaluminum relative to the amount of the spray-dried Ziegler-Natta procatalyst system of IE1a in mineral oil to give the spray-dried Ziegler-Natta catalyst system of IE1c in mineral oil. Al/Ti molar ratio based on TEAl feed=81.16. Al/Ti molar ratio based on X-ray diffraction=56.19.

Inventive Example 2a (IE2a): synthesis of a spray-dried Ziegler-Natta procatalyst system. Mix 150 g of the spray-dried particulate solid of Prep1, 520 g of a mineral oil, and 73.5 g of EADC at 30° C. for 0.5 hour to give an intermediate mixture consisting essentially of, or being a reaction product made from, the spray-dried particulate solid, mineral oil, and EADC. The intermediate mixture is free of $Ti(OiPr)_4$. Then combine the intermediate mixture with 8.7 g of $Ti(OiPr)_4$ at 30° C. for 2 hours to give the spray-dried Ziegler-Natta procatalyst system of IE2a in mineral oil.

Inventive Example 2b (IE2b): synthesis of a spray-dried Ziegler-Natta catalyst system. Contact the spray-dried Ziegler-Natta procatalyst system of IE2a in mineral oil with triethylaluminum at 30° C. for 0.02 hour to give the spray-dried Ziegler-Natta catalyst system of IE2b in mineral oil.

Comparative Example 1a (CE1a): comparative spray-dried Ziegler-Natta procatalyst system. Add anhydrous tetrahydrofuran (14 kg) to a feed tank. Next add finely-divided solid $MgCl_2$ (1255 g). Heat mixture to 60° C., and mix it for 5 hours to overnight to form a third solution. Cool third solution to 40° C. to 45° C. Then add $TiCl_3.AA$ (459 g), and mix for 1 hour. Then add hydrophobic pre-treated fumed silica (Cabosil TS-610, 1.6 kg) to give a suspension. Mix the suspension for 30 minutes to give a slurry, which has a blue color. Spray the slurry in a spray dryer using the spray-drying conditions of Prep1 to give procatalyst system CE1a as a spray-dried solid. Suspend the solid in mineral oil to slurry the a procatalyst system CE1a.

Comparative Example 1b (CE1b): comparative spray-dried Ziegler-Natta catalyst system. Contact the mineral oil slurry of the spray-dried procatalyst system CD a with a chemically reducing effective amount of a reagent mixture of 40 wt % trihexylaluminum (TnHAl) reducing agent in mineral oil in a 4 liter (L) volume mix tank for approximately 1 hour to give spray-dried Ziegler-Natta procatalyst system of CE1b.

Comparative Example 1c (CE1c): comparative spray-dried Ziegler-Natta catalyst system. Contact the spray-dried Ziegler-Natta procatalyst system of CD a with a reagent mixture of 12 wt % diethylaluminum chloride (DEAC) in mineral oil, and mix for 1 hour to give the spray-dried Ziegler-Natta catalyst system of CE1c. The molar ratio of TnHAl used in CD1c to DEAC used in CD a is approximately 0.875/1.000. A commercial UCAT™ J catalyst. Al/Ti molar ratio based on TEAl feed=29.86. Al/Ti molar ratio based on X-ray diffraction=40.78.

Inventive Examples A and B (IE(A) and IE(B)): copolymerize ethylene and 1-butene catalyzed by the spray-dried Ziegler-Natta catalyst system of IE1b or IE1c, respectively, to give an ethylene/1-butene copolymer composition IE(A) or IE(B), respectively. Produced the ethylene/1-butene copolymer composition of IE(A) or IE(B) in a single gas phase polymerization reactor with a capacity of producing 10 to 35 kg resin per hour. For an experimental run, preloaded the reactor before startup with a seedbed of granular resin inside. Dried down the reactor with the seedbed below 5 ppm moisture with high purity nitrogen. Then introduced reaction constituent gases, ethylene, hydrogen, and 1-butene, to the reactor to build a desired gas phase composition as shown below in Table 1. At the same time heated the reactor up to the desired temperature. Once the polymerizing conditions were reached, injected a feed of activator triethylaluminum (TEAI) and injected a feed of a slurry of 17 wt % of the spray-dried Ziegler-Natta catalyst system of IE1b or IE1c in mineral oil into the reactor. Used about 5 to 10 bed turnovers to reach steady-state production of the ethylene/1-butene copolymer composition, thereby giving the embodiment of the inventive ethylene/1-butene copolymer composition of IE(A) or IE(B). Collected the inventive ethylene/1-butene copolymer composition from the reactor's product discharge outlet.

Inventive Example C (IE(C)): Copolymerize ethylene and 1-butene catalyzed by the spray-dried Ziegler-Natta procatalyst system IE2a to give an ethylene/1-butene copolymer composition IE(C). Produced the ethylene/1-butene copolymer composition of IE(C) in a single gas phase polymerization reactor with a capacity of producing 10 to 35 kg resin per hour. For this example, the reactor was already operating with this catalyst system when the run began. To transition to this Inventive Example C, separate catalyst activator and catalyst system feeds were adjusted and injected into the reactor. The catalyst activator consisted of 2.5 Wt % triethylaluminum in isopentane fed to maintain a 108 Al/Ti molar ratio with the catalyst system feed. The catalyst system feed consisted of 20 wt % IE2a procatalyst system in mineral oil carried by 3 pounds per hour of isopentane. The procatalyst system and isopentane were dispersed with 1.5 pounds per hour of nitrogen before being injected into the reactor. The gas phase reactor gas composition was adjusted by adjusting the feeds of hydrogen, ethylene, isopentane, and 1-butene to achieve the composition shown in Table 1. The reactor was allowed to run for 7 bed turnovers to reach steady-state production of the ethylene/1-butene copolymer composition, thereby giving the embodiment of the inventive ethylene/1-butene copolymer composition of IE(C). Collected the inventive ethylene/1-butene copolymer composition from the reactor's product discharge outlet.

Inventive Example C (IE(C)): Copolymerize ethylene and 1-butene catalyzed by the spray-dried Ziegler-Natta procatalyst system IE2a to give an ethylene/1-butene copolymer composition IE(C). Produced the ethylene/1-butene copolymer composition of IE(C) in a single gas phase polymerization reactor with a capacity of producing 10 to 35 kg resin per hour. For this example, the reactor was already operating with this catalyst system when the run began. To transition to this Inventive Example C, separate catalyst activator and catalyst system feeds were adjusted and injected into the reactor. The catalyst activator consisted of 2.5 Wt % triethylaluminum in isopentane fed to maintain a 108 Al/Ti molar ratio with the catalyst system feed. The catalyst system feed consisted of 20 wt % IE2a procatalyst system in mineral oil carried by 3 pounds per hour of isopentane. The procatalyst system and isopentane were dispersed with 1.5 pounds per hour of nitrogen before being injected into the reactor. The gas phase reactor gas composition was adjusted by adjusting the feeds of hydrogen, ethylene, isopentane, and 1-butene to achieve the composition shown in Table 1. The reactor was allowed to run for 7 bed turnovers to reach steady-state production of the ethylene/1-butene copolymer composition, thereby giving the embodiment of the inventive ethylene/1-butene copolymer composition of IE(C). Collected the inventive ethylene/1-butene copolymer composition from the reactor's product discharge outlet.

Comparative Example A (CE(A)): copolymerize ethylene and 1-butene catalyzed by a spray-dried Ziegler-Natta catalyst system of CE1c to give an ethylene/1-butene copolymer composition CE(A). Replicate Inventive Example A except use the commercial UCAT™ J spray-dried Ziegler-Natta catalyst system of CE1b containing tetrahydrofuran as organic modifier but lacking ethanol. Reactor and process conditions are listed later in Table 2. Collected the comparative ethylene/1-butene copolymer composition from the reactor's product discharge outlet.

Comparative Example B (CE(B)): copolymerize ethylene and 1-butene catalyzed by a spray-dried Ziegler-Natta procatalyst system of CE1a to give an ethylene/1-butene copolymer composition CE(B). Replicate Inventive Example C except use the spray-dried Ziegler-Natta procatalyst system of CE1a. The Al/Ti ratio target for the triethylaluminum catalyst activator directly fed to the reactor was 34 mol/mol. The Al/Ti ratio target for the triethylaluminum catalyst activator mixed with the CE1a procatalyst system was 15 mol/mol. Reactor and process conditions are listed later in Table 2. Collected the comparative ethylene/1-butene copolymer composition from the reactor's product discharge outlet.

Characterized the inventive ethylene/1-butene copolymer composition of IE(A) and the comparative ethylene/1-butene copolymer composition of CE(A) by density, melt index (I2), melt index-5 (I5), high load melt index (I21), melt flow ratio (I21/I2), fluidized bulk density, and settled bulk density using the aforementioned respective test methods.

TABLE 1 gas phase copolymerization process/reactor conditions of IE(A) to IE(D).

| Reaction Constituent/ Parameter | polymerizing conditions of IE(A) | polymerizing conditions of IE(B) | polymerizing conditions of IE(C) | polymerizing conditions of IE(D) |
|---|---|---|---|---|
| Reactor | single, continuous-mode, fluidized bed | | | |
| Starting seedbed weight | 36.9 kg | 33.1 kg | Reactor already in operation | |
| Starting seedbed composition = granular HDPE resin | Preloaded in reactor | | Reactor already in operation | |
| Reactor Purging method | Anhydrous $N_2$ gas | | Reactor already in operation | |
| Reaction pressure (kPa) | 2410 | 2410 | 2054 | 2057 |
| Ethylene ("C2") partial pressure (kPa) | 827 | 828 | 691 | 689 |
| Comonomer = 1-butene molar ratio C4/C2 | 0.450 | 0.401 | 0.429 | 0.380 |
| Molecular hydrogen gas ("H2") molar ratio H2/C2 | 0.288 | 0.211 | 0.243 | 0.205 |
| Induced condensing agent 1: isopentane (mol %) | 0.00 | 0.00 | 4.44 | 3.80 |
| Operating reactor bed temperature (° C.) | 88.0 | 88.0 | 88.0 | 88.0 |
| Superficial gas velocity (SGV, meters/second) | 0.51 m/s | 0.50 m/s | 0.50 m/s | 0.52 m/s |
| spray-dried Ziegler-Natta catalyst system | IE1b | IE1c | 1E2a | 1E2a |
| Ti loading in catalyst system (wt %) | 1.01 | 1.01 | 1.1 | 1.1 |
| Total Al/Ti molar ratio TEAl feed | 22.7:1 | 81.2:1 | 107.5:1 | 149.0:1 |
| Total Al/Ti molar ratio X-ray | 29.6:1 | 56.2:1 | 84.3:1 | 109.2:1 |
| Catalyst Productivity (kg copolymer/kg catalyst) | 17720 | 38850 | 26829 | 15194 |
| Polymer product residence time (hours) | 2.51 | 2.05 | 1.75 | 2.29 |
| Polymer production rate (kg/hour) | 15 | 16 | 17 | 15 |

TABLE 2 gas phase copolymerization process/reactor conditions of CE(A) and CE(B).

| Reaction Constituent/ Parameter | polymerizing conditions of CE(A) | polymerizing conditions of CE(B) |
|---|---|---|
| Reactor | single, continuous-mode, fluidized bed | |
| Starting seedbed weight (kg) | 38.6 | Reactor already in operation |
| Starting seedbed composition = granular HDPE resin | Preloaded in reactor | Reactor already in operation |
| Reactor Purging method | Anhydrous $N_2$ gas | Reactor already in operation |
| Reaction pressure (kPa) | 2410 | 2400 |
| Ethylene ("C2") partial pressure (kPa) | 689 | 688 |
| Comonomer = 1-butene molar ratio of C4/C2 | 0.365 | 0.392 |
| Molecular hydrogen gas ("H2") molar ratio H2/C2 | 0.165 | 0.169 |
| Induced condensing agent 1: isopentane (mol %) | 0.00 | 8.16 |
| Operating reactor bed temperature (° C.) | 88.0 | 88.0 |
| Superficial gas velocity (SGV, meters/second) | 0.51 | 0.57 |
| spray-dried Ziegler-Natta catalyst system | CE1c: Commercial UCAT ™ J (THF) | CE1a |
| Ti loading in catalyst system (wt %) | 2.27 | 2.34 |
| Total Al/Ti molar ratio TEAl feed | 29.86:1 | 48.46:1 |
| Total Al/Ti molar ratio X-ray | 40.78:1 | 30.46:1 |
| Catalyst Productivity (kg copolymer/kg catalyst) | 17870 | 16479 |
| Polymer product residence time (hours) | 2.45 | 1.35 |
| Polymer production rate (kg/hour) | 16 | 19 |

As shown by the data in Tables 1 and 2, the inventive spray-dried Ziegler-Natta catalyst systems of IE1b and IE1c unpredictably had, respectively, the same catalyst productivity at an Al/Ti molar ratio of 23, and twice the catalyst productivity at an Al/Ti molar ratio of 81, relative to that of the comparative spray-dried Ziegler-Natta catalyst system of CE1b. Also, unpredictably, the inventive spray-dried Ziegler-Natta catalyst system IE2a used in IE(D) resulted in a slightly lower productivity than the comparative spray-dried Ziegler-Natta catalyst systems of CE1b and CE1a (CE(A) and CE(B)).

clarity; and/or improved abuse properties such as increased dart impact and/or increased resistance to tear in machine direction (MD) or tear direction (TD).

The improvement in settled bulk density (SBD) is shown in Table 3. IE(C) and IE(D) are both produced at higher Al/Ti molar ratios than those of IE(A) and IE(B), which would normally result in lower SBD values as shown in IE(C). However, IE(D) has an SBD that is 74.7 kg/m$^3$ greater than SBD of IE(C) and IE(D) has a fluidized bulk density (FBD) that is 50.4 kg/m$^3$ greater than FBD of IE(C). Comparatively, CE(B) does not show any improvement in

TABLE 3 properties of ethylene/1-butene copolymer compositions of CE(A), CE(B), and IE(A) to IE(D).

| Polymer Property Measured | CE(A) Results | CE(B) Results | IE(A) Results | IE(B) Results | IE(C) Results | IE(D) Results |
|---|---|---|---|---|---|---|
| Density (ASTM D792-13), g/cm$^3$ | 0.9188 | 0.9186 | 0.9189 | 0.9177 | 0.9186 | 0.9175 |
| Melt Index I$_2$ (190° C., 2.16 kg, ASTM D1238-04), g/10 min. | 1.95 | 1.76 | 1.88 | 2.06 | 2.22 | 2.03 |
| Flow Rate I$_5$ (190° C., 5.0 kg, ASTM D1238-04), g/10 min. | 5.60 | 4.99 | 5.23 | 5.79 | 6.22 | 5.78 |
| Flow Index FI$_{21}$ (190° C., 21.6 kg, ASTM D1238-04), g/10 min. | 51.0 | 44.18 | 44.4 | 50.0 | 53.70 | 51.48 |
| Melt Flow Ratio (MI$_{21}$/M$_2$) | 26.1 | 25.06 | 23.6 | 24.3 | 24.22 | 25.3 |
| Flow Rate Ratio (MI$_{21}$/M$_5$) | 9.11 | 8.85 | 8.49 | 8.64 | 8.66 | 8.92 |
| Number-average molecular weight (M$_n$), g/mol | 25,810 | N/m | 28,320 | 28,780 | 26,803 | 25,154 |
| Weight-average molecular weight (M$_w$), g/mol | 103,630 | N/m | 101,260 | 105,990 | 98,566 | 103,310 |
| Molecular mass dispersity (M$_w$/M$_n$), Đ$_M$ | 4.02 | N/m | 3.58 | 3.68 | 3.677 | 4.107 |
| Settled Bulk Density (kg/m$^3$) | 358.8 | 314.5 | 379.6 | 331.6 | 273.9 | 348.6 |
| Fluidized Bulk Density (kg/m$^3$) | 198.6 | 154.11 | 193.8 | 174.6 | 160.0 | 210.4 |

N/m not measured.

As shown by the data in Table 3, the inventive ethylene/1-butene copolymer of IE(A) or IE(B), and by association the inventive spray-dried Ziegler-Natta catalyst system of IE1b or IE1c, showed significant improvements in narrower molecular mass dispersity (M$_w$/M$_n$), Đ$_M$, and in FIG. 1 showed significant improvements in narrower comonomer composition distribution (CCD) relative to the comparative ethylene/1-butene copolymer of CE(A) and by association the comparative Ziegler-Natta catalyst system of CE1c.

The improvement in CCD is illustrated in FIG. 1. In FIG. 1, the inventive examples IE(A) and IE(B) show a more uniform co-monomer composition distribution across the indicated weight-average molecular weight range than that of the comparative example CE(A). That is, the peaks at 30° C. and 100° C. are smaller for the inventive examples than for the comparative example. The results shown in FIG. 1 reflect structural differences in the inventive ethylene/1-butene copolymer versus the comparative ethylene/1-butene copolymer. These structural differences are expected to result in an improved balance of properties in extruded products, such as high-strength thin-gauge films, made by extruding the inventive ethylene/1-butene copolymer. The improved balance of properties may include improved optical properties such as decreased haze and/or increased SBD when compared to CE(A), demonstrating that this effect on the inventive catalyst system is unexpected for inventive spray-dried Ziegler-Natta catalyst system. Comparing IE(D) to IE(C) is done to show that the TEAI pre-contacting mentioned earlier does increase SBD, all other things being equal. Keep in mind IE(D) is lower than IE(A) because the former's total Al/Ti is lower. Although CE(B) was produced with TEAI pre-contacting method, CE(B) shows no improvement in SBD, demonstrating that the comparative catalyst example does not respond to the inventive pre-contacting method.

The invention claimed is:

1. A method of making a spray-dried Ziegler-Natta procatalyst system, the method comprising:
   mixing a spray-dried particulate solid, consisting essentially of a hydrophobic fumed silica, MgCl$_2$, and THF, with a hydrocarbon liquid and one of titanium tetraisopropoxide (Ti(OiPr)$_4$) and ethylaluminum dichloride (EADC), but not both Ti(OiPr)$_4$ and EADC, to give an intermediate mixture consisting essentially of, or being a reaction product made from, the spray-dried particulate solid, hydrocarbon liquid, and either Ti(OiPr)$_4$ or EADC, but not both Ti(OiPr)$_4$ and EADC; and combining the intermediate mixture with the other one of the Ti(OiPr)$_4$ or EADC that was not used in the mixing step to give the spray-dried Ziegler-Natta procatalyst system.

2. A method of making a spray-dried Ziegler-Natta catalyst system, the method comprising contacting the spray-dried Ziegler-Natta procatalyst system made by the method of claim 1 with an activator to give the spray-dried Ziegler-Natta catalyst system.

3. The method of claim 2 characterized by any one of limitations (i) to (viii): (i) wherein the hydrocarbon liquid is mineral oil; (ii) wherein the activator is a trialkylaluminum; (iii) both (i) and (ii); (iv) wherein the hydrophobic fumed silica is a product of pre-treating a hydrophilic fumed silica (untreated) with a silicon-based hydrophobing agent; (v) wherein the hydrophobic fumed silica is a product of pre-treating a hydrophilic fumed silica (untreated) with a silicon-based hydrophobing agent selected from trimethylsilyl chloride, dimethyldichlorosilane, a polydimethylsiloxane fluid, hexamethyldisilazane, an octyltrialkoxysilane, and a combination of any two or more thereof; (vi) both (i) and (v); (vii) both (ii) and (v); and (viii) both (iii) and (v).

4. The method of claim 1 further comprising, in a preliminary step before the mixing step, admixing the spray-dried particulate solid in the hydrocarbon liquid to give an admixture of the spray-dried particulate solid consisting essentially of a hydrophobic fumed silica, MgCl$_2$, and tetrahydrofuran (THF) in a hydrocarbon liquid; and wherein the spray-dried particulate solid and hydrocarbon liquid used in the mixing step is supplied to the mixing step as the admixture.

5. The method of claim 1 further comprising, in a preliminary step before the mixing step and any admixing step, spray-drying a suspension of the hydrophobic fumed silica in a solution of magnesium dichloride (MgCl$_2$) in tetrahydrofuran (THF) to give the spray-dried particulate solid consisting essentially of the hydrophobic fumed silica, MgCl$_2$, and THF.

6. A method of making a polyolefin polymer, the method comprising contacting an olefin monomer and optionally zero, one, or more olefin comonomer(s) with the spray-dried Ziegler-Natta catalyst system of claim 2 to give a polyolefin polymer comprising a polyolefin homopolymer or copolymer, respectively.

7. The method of claim 6 wherein the polyolefin polymer is a polyethylene polymer, the method comprising contacting ethylene and optionally zero, one, or more (C$_3$-C$_{20}$) alpha-olefins with the spray-dried Ziegler-Natta catalyst system to give a polyethylene polymer comprising a polyethylene homopolymer or an ethylene/(C$_3$-C$_{20}$)alpha-olefin copolymer, respectively.

8. The method of claim 7 comprising a gas phase polymerization of the ethylene and the (C$_3$-C$_{20}$)alpha-olefin in the presence of molecular hydrogen gas and, optionally, an induced condensing agent in one, two or more gas phase polymerization reactors under polymerizing conditions, thereby making the polyethylene polymer; wherein the polymerizing conditions comprise a reaction temperature from 80 degrees (°) to 110° Celsius (C.); a molar ratio of the molecular hydrogen gas to the ethylene from 0.001 to 1; and a molar ratio of the comonomer to the ethylene from 0.001 to 0.8.

9. The method of claim 6, the method comprising pre-mixing the spray-dried Ziegler-Natta catalyst system and with an activator together for a pre-mixing period of time to make an activated catalyst system, and then injecting the activated catalyst system into the reactor, wherein the injected activated catalyst system contacts the olefin monomer and any olefin comonomer(s) to give a polyolefin homopolymer or copolymer, respectively.

\* \* \* \* \*